United States Patent
Nakano et al.

(10) Patent No.: US 8,280,442 B2
(45) Date of Patent: Oct. 2, 2012

(54) RADIO BASE STATION AND RECEIVER FAULT DIAGNOSIS METHOD

(75) Inventors: Haruo Nakano, Yokohama (JP); Kazuyuki Hori, Tokyo (JP); Masanori Taira, Yokohama (JP); Takahiro Chiba, Yokohama (JP); Yasuyuki Magara, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 569 days.

(21) Appl. No.: 12/485,554

(22) Filed: Jun. 16, 2009

(65) Prior Publication Data

US 2010/0075709 A1   Mar. 25, 2010

(30) Foreign Application Priority Data

Sep. 22, 2008   (JP) ................................. 2008-242051

(51) Int. Cl.
| | | |
|---|---|---|
| H04B 17/00 | (2006.01) | |
| H04B 1/10 | (2006.01) | |
| H04B 1/38 | (2006.01) | |
| H04B 3/46 | (2006.01) | |
| H04Q 1/20 | (2006.01) | |
| H03D 1/04 | (2006.01) | |
| H03D 1/06 | (2006.01) | |
| H03K 5/01 | (2006.01) | |
| H03K 6/04 | (2006.01) | |
| H04L 1/00 | (2006.01) | |
| H04L 25/08 | (2006.01) | |
| G01R 31/08 | (2006.01) | |
| G06F 11/00 | (2006.01) | |
| G08C 15/00 | (2006.01) | |
| H04J 1/16 | (2006.01) | |
| H04J 3/14 | (2006.01) | |
| H04L 12/26 | (2006.01) | |

(52) U.S. Cl. ..................... 455/561; 455/226.1; 455/296; 375/227; 375/346; 370/242; 370/247

(58) Field of Classification Search .................. 455/561, 455/139, 147, 148, 154.1, 184.1, 222, 226.1, 455/278.1, 283, 295, 296, 318, 341; 375/224, 375/227, 346; 370/241, 242, 247, 249, 251
See application file for complete search history.

(56) References Cited

U.S. PATENT DOCUMENTS 5,237,332 A * 8/1993 Estrick et al. .................. 342/174
5,874,856 A * 2/1999 Van Horn ...................... 330/151
(Continued)

FOREIGN PATENT DOCUMENTS

JP         11-154903        6/1999
(Continued)

*Primary Examiner* — Andrew Wendell
(74) *Attorney, Agent, or Firm* — Antonelli, Terry, Stout & Kraus, LLP.

(57) ABSTRACT

Even if a receiver has a normal gain and a lowered intermodulation distortion characteristics, a fault detection is possible. A test signal transmitter sends a test signal having at least two frequencies to a radio receiver through a coupler. A digital signal processing section receives a signal which includes an IM3 component generated by the radio receiver and measures the electric power of fundamental wave components and the IM3 component. Then, the digital signal processing section calculates the gain of the radio receiver and IIP3, which is an index for intermodulation distortion characteristics, of the radio receiver 207 from the calculated electric power. A base station control section determines whether the gain and IIP3 of the radio receiver fall in predetermined ranges to determine whether the radio receiver works normally or has a fault.

10 Claims, 6 Drawing Sheets

U.S. PATENT DOCUMENTS

| | | | |
|---|---|---|---|
| 7,031,687 B2 * | 4/2006 | Kivekas et al. | 455/313 |
| 7,340,219 B2 * | 3/2008 | Heaton et al. | 455/67.11 |
| 7,593,699 B2 * | 9/2009 | Duperray | 455/114.2 |
| 7,821,337 B2 * | 10/2010 | Yamanouchi et al. | 330/149 |
| 2001/0033238 A1 * | 10/2001 | Velazquez | 341/118 |
| 2004/0070450 A1 * | 4/2004 | Lindell | 330/149 |
| 2007/0042740 A1 * | 2/2007 | Woo-nyun | 455/302 |
| 2009/0086028 A1 * | 4/2009 | Miller et al. | 348/180 |

FOREIGN PATENT DOCUMENTS

| | | |
|---|---|---|
| JP | 2001-127715 | 5/2001 |
| JP | 2005-151189 | 6/2005 |

* cited by examiner

RADIO BASE STATION AND RECEIVER FAULT DIAGNOSIS METHOD

CLAIM OF PRIORITY

The present application claims priority from Japanese patent application JP 2008-242051 filed on Sep. 22, 2008, the content of which is hereby incorporated by reference into this application.

BACKGROUND OF THE INVENTION

1. Field of the Invention

The present invention relates to radio base stations and receiver fault diagnosis methods, and more particularly, to a radio base station having a transmitter for a diagnostic test and a receiver fault diagnosis method for the radio base station.

2. Description of the Related Art

Recent mobile communication systems are used not only for voice calls but also widely for data communication. As the number of data communication users has been increased, it is demanded that the data communication rate be increased. To handle the increased number of users and the demand for a higher data communication rate, a recent base station has started using multiple carriers. The number of carriers the base station transmits and receives at the same time has been increased and carrier allocation has become denser.

For the third generation mobile communication systems, new mobile communication methods are currently being standardized, such as a long term evolution (LTE) method and a ultra mobile broadband (UMB) method, which use orthogonal frequency division multiple access (OFDMA), having a higher frequency use efficiency than code division multiple access (CDMA), which has been used. In the future, it is expected that the conventional CDMA and OFDMA will be both used in an identical base station at an identical frequency band. Therefore, it is anticipated that the number of carriers will be increased and the carrier allocation will become denser, even more in the future.

FIG. 1A and FIG. 1B show example electromagnetic wave environments at a multi-carrier base station.

In the base station, an intermodulation (IM) component, which is an intermodulation distortion component, is generated by an amplifier or other devices, for example. As shown in FIG. 1A, for example, two desired wave carriers 101 produce third-order intermodulation distortion (IM3) components 102. When a signal having two frequencies f1 and f2 is input to an amplifier or other devices, their second harmonics are produced by the non-linearity of the device. These second harmonics and the fundamentals generate frequency components (2f1-f2) and (2f2-f1), which are generally called IM3.

As described above, as the number of carriers is increased and the carrier allocation becomes denser in the base station, produced IM3 components 102 are also increased as shown in FIG. 1B. Since the IM3 components 102 overlap with the desired wave carriers 101, the IM3 components 102 serve as noise, affecting the system largely in some cases. Therefore, if the intermodulation distortion characteristics of the base station deteriorate, it influences the system largely in some cases.

During operation, system stability is important, and if a fault occurs, it is demanded that the fault be detected quickly and the original condition be restored. Faults to be detected include, for example, not only a communication disconnection but also a lowered throughput in communication. In the latter case, an external environment may affect, which is peculiar to radio units. To determine the cause of the fault, fault diagnosis is an indispensable function for the radio base station.

It is relatively easy to implement fault diagnosis in a transmitter by extracting a part of a main transmission signal and monitoring it. However, it is difficult to detect a fault in a receiver with the same method because the electric power of a signal input to the receiver varies moment by moment. Therefore, various techniques have been proposed so far to detect a fault in a receiver.

As a first example technique, Japanese Unexamined Patent Application Publication No. Hei-11-154903 discloses the determination of a defective portion in a receiver of a base station by means of electric power. As a second example technique, Japanese Unexamined Patent Application Publication No. 2001-127715 discloses the determination of a defect by using a part of the output signal of a local oscillator of a receiver as a test signal and measuring the electric power of the test signal received. As a third example technique, Japanese Unexamined Patent Application Publication No. 2005-151189 discloses fault diagnosis in which a base station has a terminal function section to allow tests for radio characteristics such as receiving sensitivity to be performed during operation.

These techniques mainly detect a gain error as a receiver fault. The detection of an error in the intermodulation distortion characteristics of a base station has not been disclosed.

SUMMARY OF THE INVENTION

As described above, when base stations use multiple carriers; the number of carriers to be handled at the same time is increased; and the carrier density becomes high, the intermodulation distortion characteristics of each base station are an important factor in system performance.

With the techniques described above, if an amplifier or other device that constitutes a receiver in a base station becomes defective and a gain error is detected, for example, a fault can be detected. Faults in the amplifier or other device include a fault in which only the intermodulation distortion characteristics deteriorate. In such a case, the fault cannot be detected with the above-described techniques.

If the intermodulation distortion characteristics of a base station deteriorate, when the number of users is small and the number of carriers to be handled by the base station at the same time is also small, the characteristics hardly affect the system. When the number of carriers becomes large and the carrier allocation becomes dense, the characteristics affect the system much in some cases. In a system that performs upstream electric power control, for example, deterioration in the intermodulation distortion characteristics causes deterioration in receiving quality. Therefore, in some cases, the base station needs to have higher receiving electric power and the terminal uses extra electric power. In addition, the highest throughput is not obtained in some cases. In a dense carrier allocation, a system operated by another business party that uses a carrier in an adjacent frequency band may be influenced. In the same way, since mobile worldwide interoperability for microwave access (WIMAX) and the next generation personal handy-phone system (PHS) are time division duplex (TDD) systems, if a local system and a remote system are not synchronous with each other, receiving at the local system and transmission at the remote system may overlap, and the intermodulation distortion characteristics of the local system may affect the remote system.

The diagnosis methods that use the gain of an amplifier or other device, or receiving sensitivity to detect a fault of a receiver, disclosed in Japanese Unexamined Patent Application Publications No. Hei-11-154903, No. 2001-127715, and No. 2005-151189, described above, cannot detect deterioration in the intermodulation distortion characteristics of the base station as a fault. Therefore, in most cases, it is determined that the influence of the characteristics is caused by an external factor, and the system is operated continuously without exhibiting its highest performance.

Accordingly, an object of the present invention is to detect a fault in which the intermodulation distortion characteristics of a receiver deteriorate. Another object of the present invention is to detect a fault in which the intermodulation distortion characteristics of a receiver deteriorate whereas the gain is maintained. Still another object of the present invention is to provide a fault detection method for allowing a multi-carrier base station to continue its operation with its intrinsic performance being exhibited.

In one aspect of a radio base station according to the present invention, a plurality of test signals are input into a receiver of the base station; the gain of the receiver, and an intermodulation distortion component produced by the receiver are measured; and deterioration in the intermodulation distortion characteristics of the receiver is detected.

More specifically, in the present invention, a base station includes a transmitter for a fault diagnostic test for a receiver, and two carriers having different frequencies are generated and used as test signals. The test signals are input into the receiver; the electric power of the carriers after they pass through the receiver, and the electric power of an intermodulation distortion component produced by the two carriers are measured; and the gain of the receiver and the third input intercept point (IIP3), which is an index of the intermodulation distortion characteristics, are calculated. Even if the intermodulation distortion characteristics deteriorate whereas the gain of the receiver is maintained, the deterioration can be detected as a fault.

According to the first solving means of this invention, there is provided a radio base station comprising:

a receiver for amplifying a signal having a plurality of frequencies and outputting a signal which includes a fundamental wave component of the signal and a intermodulation distortion component caused by intermodulation of the signal;

a signal oscillation source for generating at least two test signals having a predetermined frequency interval;

a signal processing section for receiving the test signals generated by the signal oscillation source and amplified by the receiver and obtaining an intermodulation distortion component thereof; and a control section for determining whether obtained intermodulation distortion component falls within a predetermined allowable range to determine whether the receiver works normally or an intermodulation error occurs.

According to the second solving means of this invention, there is provided a receiver fault diagnosis method for diagnosing a fault of a receiver for amplifying a signal having a plurality of frequencies and outputting a signal which includes a fundamental wave component of the signal and a intermodulation distortion component caused by intermodulation of the signal, the method comprising steps of:

generating at least two test signals having a predetermined frequency interval;

outputting the test signals to the receiver;

obtaining an intermodulation distortion component of the test signals amplified by the receiver; and determining whether obtained intermodulation distortion component falls within a predetermined allowable range to determine whether the receiver works normally or an intermodulation error occurs.

According to the present invention, it is possible to detect a fault in which the intermodulation distortion characteristics of a receiver deteriorate. According to the present invention, it is possible to detect a fault in which the intermodulation distortion characteristics of a receiver deteriorate whereas the gain is maintained. According to the present invention, it is possible to provide a fault detection method for allowing a multi-carrier base station to continue its operation with its intrinsic performance being exhibited.

DESCRIPTION OF THE PREFERRED EMBODIMENTS

An embodiment of the present invention will be described below with reference to the drawings.

Figure 1A:
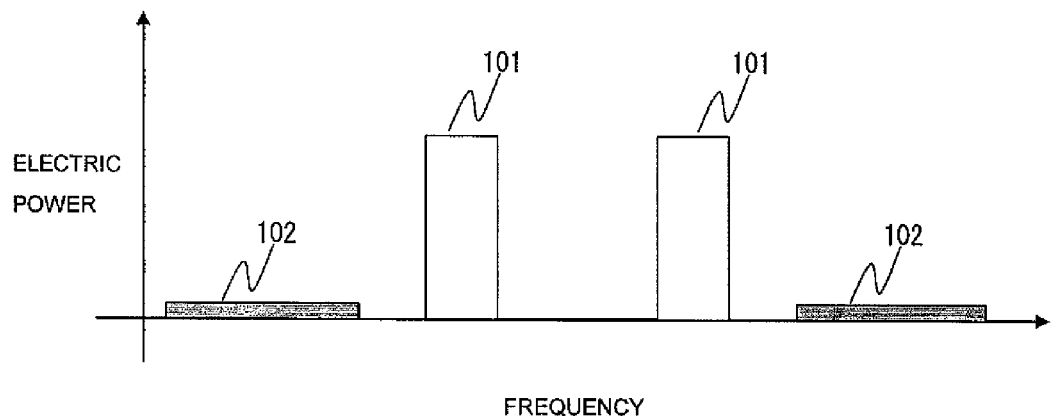
FIG. 1A and FIG. 1B show example electromagnetic-wave environments in a multi-carrier base station.
Figure 1B:
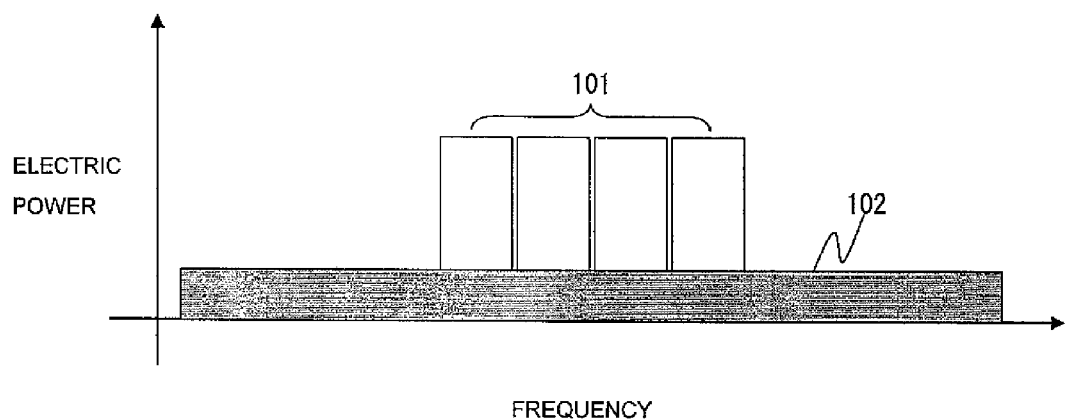
Figure 2:
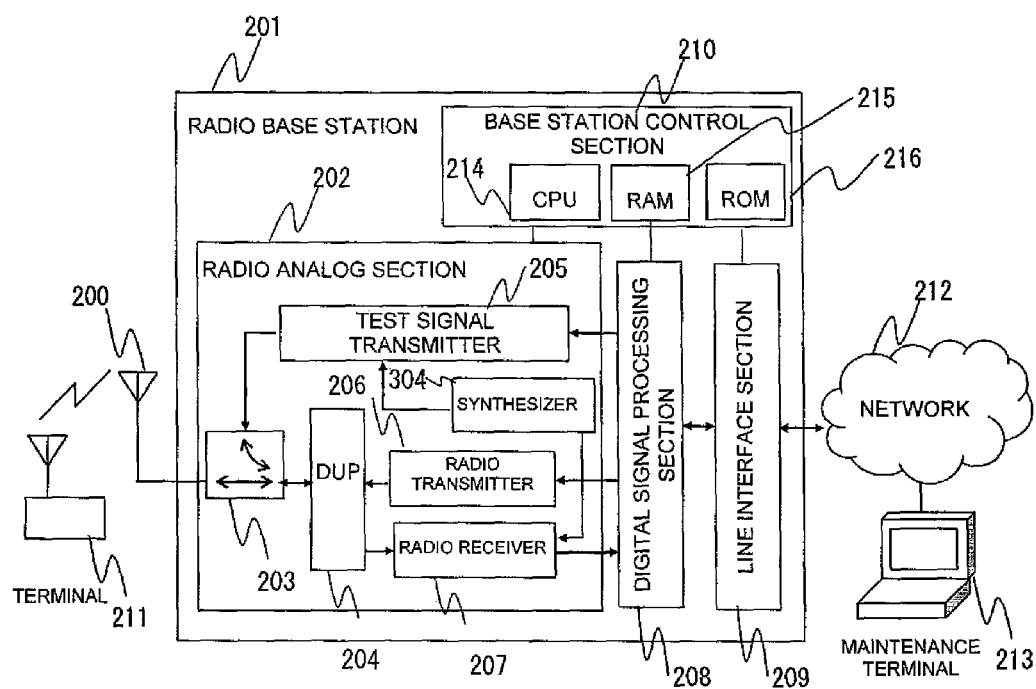
FIG. 2 is a view showing the structure of a radio base station according to an embodiment of the present invention.

FIG. 2 shows the structure of a radio base station 201 according to an embodiment of the present invention.

The radio base station 201 includes, for example, a radio analog section 202, a digital signal processing section 208, a line interface section 209, and a base station control section 210.

The radio analog section 202 is connected to an antenna 202 used for both transmission and receiving. The radio analog section 202 includes, for example, a duplexer (DUP) 204 for separating a downstream radio signal and a upstream radio signal, a radio transmitter 206, a radio receiver 207, a test signal transmitter 205 used for fault diagnosis, a synthesizer 304, and a coupler 203 for inputting a test signal to the radio receiver 207.

The digital signal processing section 208 performs data modulation and demodulation, and digital processing for a radio signal and a test signal. The line interface section 209 serves as an interface between the radio base station 201 and a network 212. The radio base station control section 210 includes a processor (CPU) 214, a random access memory (RAM) 215, and a read only memory (ROM) 216 (other types of memories can be used), and monitors and controls the radio base station 201.

A maintenance terminal 213 is connected to the radio base station control section 210 through the network 212 and the line interface section 209, and has a function of monitoring and controlling the radio base station 210 at a remote place.

To allow diversity receiving or diversity transmission and receiving, the radio base station 201 may include a plurality of the radio analog sections 202 or may have a plurality of sectors.

Figure 3:
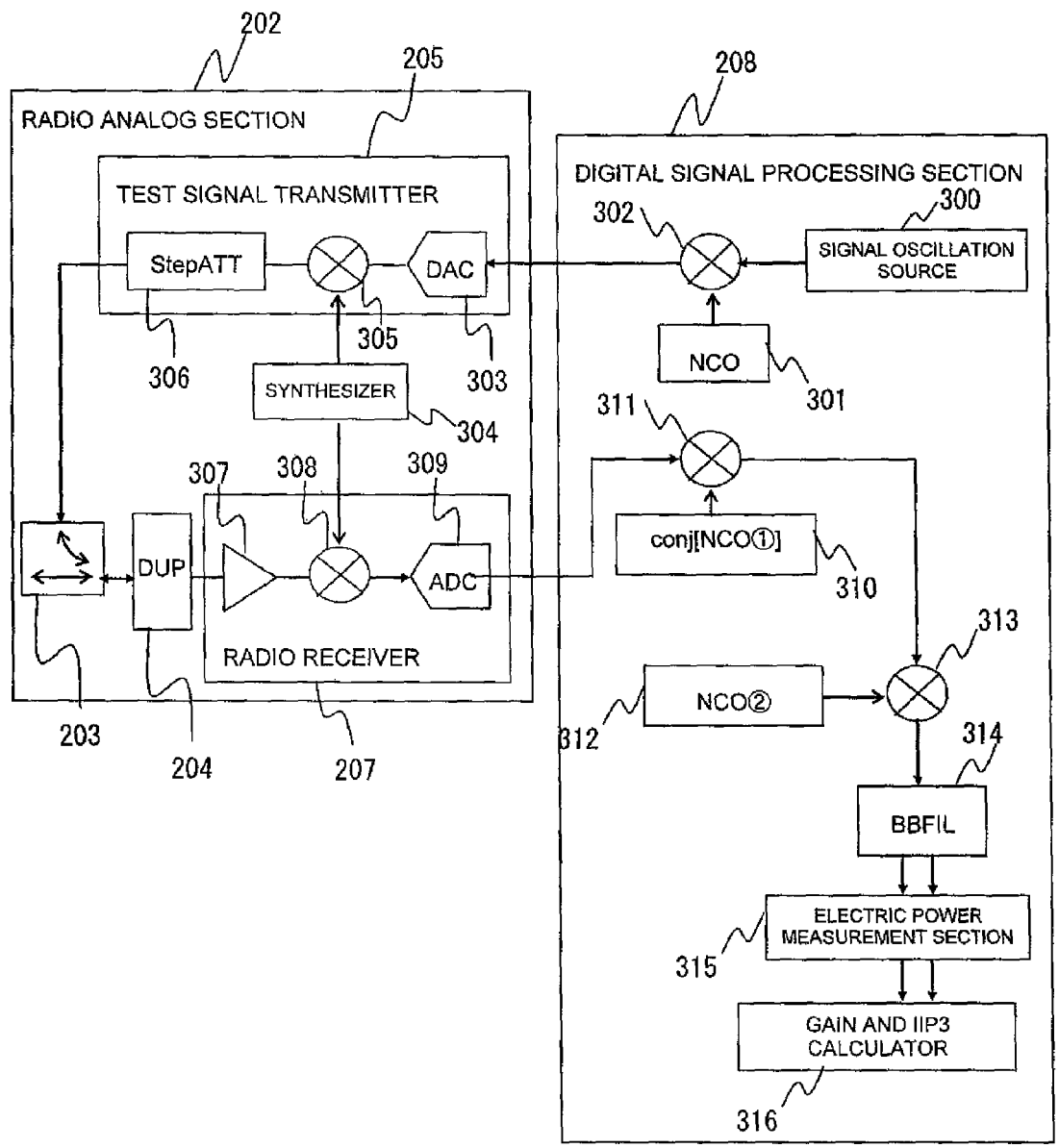
FIG. 3 is a block diagram of blocks related to fault diagnosis in a ratio analog section and a digital signal processing section in the radio base station.

FIG. 3 is a block diagram of blocks related to fault diagnosis in the radio analog section 202 and the digital signal processing section 208.

More specifically, FIG. 3 shows detailed structures of the radio receiver 207, the test signal transmitter 205, and the digital signal processing section 208.

The radio receiver 207 includes, for example, a low noise amplifier (LNA) 307, a downconverter 308, and an analog-to-digital converter (ADC) 309. The test signal transmitter 205 includes, for example, a digital-to-analog converter (DAC) 303, an upconverter 305, and a step attenuator (StepATT) 306.

The digital signal processing section 208 includes, for example, a signal oscillation source 300, a first numerical controlled oscillator (NCO(1)) 301, a mixer 302, a conjugate oscillator (conj[NCO(1)]) 310, a mixer 311, a second numerical controlled oscillator (NCO(2)) 312, a mixer 313, a baseband filter (BBFIL) 314, an electric power measurement section 315, and a gain and IIP3 calculator 316.

FIG. 5A to FIG. 5G show a test signal for fault diagnosis. More specifically, FIGS. 5A to 5G illustrate the frequencies of the test signal at several time points in the structures shown in FIG. 3. How the test signal is processed in each block will be described below.

Figure 5A:
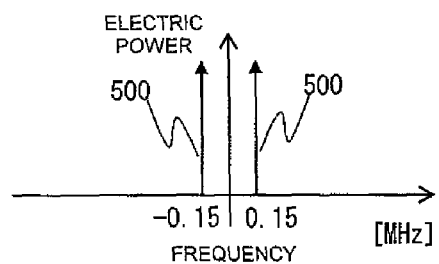
FIG. 5A to FIG. 5G show test signals in the embodiment.

The signal oscillation source 300 generates the test signal used for fault diagnosis. As shown in FIG. 5A, for example, the signal oscillation source 300 generates a non-modulation-wave signal having a frequency interval of ±150 kHz. These two-frequency components in the signal are hereinafter called fundamental wave components 500. In FIG. 5A, the test signal includes only the fundamental wave components. The frequency interval of the test signal may be determined in advance, or may be specified by a diagnosis start instruction sent from the maintenance terminal 213. The frequencies or the center frequency of test signal can be determined in advance. The frequency interval of the fundamental wave components 500 may be set to other values.

The fundamental wave components 500 are converted in frequency in the mixer 302 by the frequency of a signal output from the NCO(1) 301. The NCO(1) 301 can shift the frequencies, for example, by the radio bandwidth (such as 20 MHz) of the radio base station 201. The frequency of the signal sent from the NCO(1) 301 is set by the radio base station control section 210 to a frequency corresponding to a channel (frequency used for a test) specified by the maintenance terminal 213, for example. The mixer 302 in the digital signal processing section 208 sends the fundamental wave components 500 converted in frequency to the test signal transmitter 205 in the radio analog section 202.

Figure 5B:
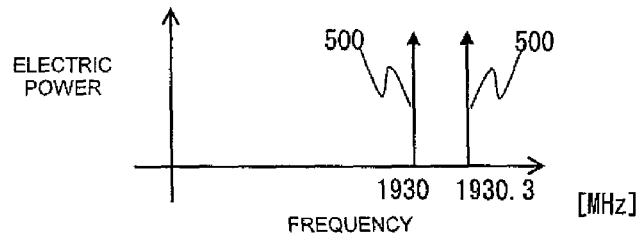

In the test signal transmitter 205, the received test signal is converted from the digital signal to an analog signal by the DAC 303, and then, is converted in frequency into a radio frequency band by the upconverter 305 with a signal sent from the synthesizer 304 being used as a local signal (FIG. 5B). Then, the test signal transmitter 205 adjusts the electric power of the test signal to be input to the radio receiver 207 by using the StepATT 306, and outputs the test signal to the radio receiver 207 through the coupler 203. When the electric power of the test signal input to the radio receiver 207 is adjusted in advance, for example, to a desired electric power at the output of the coupler 203, it becomes almost unnecessary to take into account the effect of a variation in the test signal, allowing a precise detection of a fault in the radio receiver 207. Here, the StepATT 306 adjusts the electric power of the test signal input to the radio receiver 207. To adjust it more precisely, the digital signal processing section 208 may adjust it. The test signal is input into the radio receiver 207 through the DUP 204.

In the radio receiver 207, the test signal is converted from the radio frequency band to the original baseband frequency and then converted to a digital signal by the LNA 307, the downconverter 308, and the ADC 309. Then, the radio receiver 207 outputs the test signal to the digital signal processing section 208.

Figure 5C:
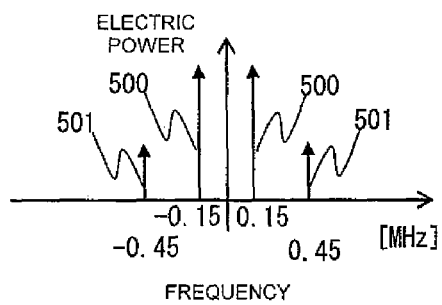
Figure 5D:
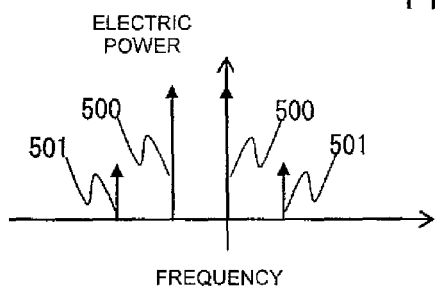
Figure 5E:
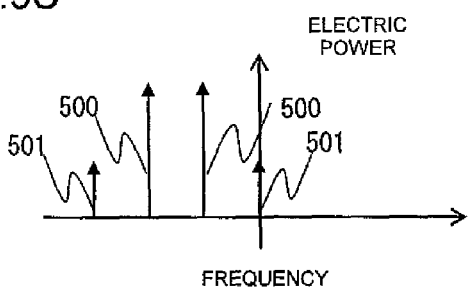

In the digital signal processing section 208, the input test signal is converted to have the frequency of the original test signal generated by the signal oscillation source 300, by the mixer 311 and the conj[NCO(1)] 310, which is a complex conjugate of the NCO(1) 301. As shown in FIG. 5C, the test signal output from the radio receiver 207 has, in addition to the fundamental wave components 500, IM3 components 501 generated by the radio receiver 207 at frequencies further apart from those of the fundamental wave components 500 by the frequency interval of the fundamental wave components 500. In the present embodiment, the frequency interval of the fundamental wave components 500 is 300 kHz. Therefore, the IM3 components 501 have a frequency of ±450 kHz (=+150 KHz+300 kHz) and a frequency of −450 kHz (=−150 kHz−300 kHz).

Figure 5F:
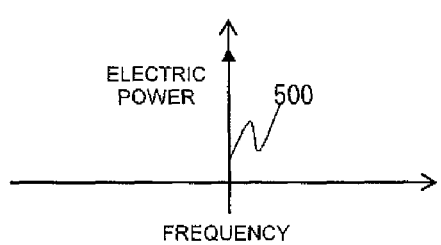
Figure 5G:
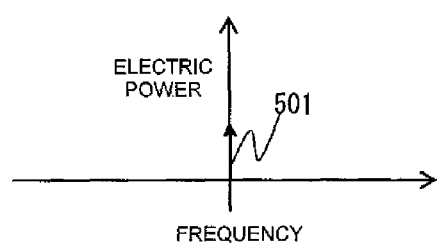

Then, the test signal is converted in frequency in the mixer 313 by the frequency of a signal generated by the NCO(2) 312. The frequency of the signal generated by the NCO(2) 312 can be set, for example, to half or 3/2 times the frequency interval of the fundamental wave components 500. In the present embodiment, since the frequency interval of the fundamental wave components 500 is 300 kHz, the NCO(2) 312 switches the frequency at time intervals determined in advance, between 150 kHz, which is half the frequency interval of the fundamental wave components 500, and 450 kHz, which is 3/2 times the frequency interval of the fundamental wave components 500. The mixer 313 generates two signals by converting in frequency the test signal by 150 kHz and 450 kHz based on the signals generated by the NCO(2) 312. The two generated test signals are sent from the mixer 313 to the BBFIL 314 while being time-division multiplexed. The BBFIL 314 has notch-filter characteristics which, for example, attenuate at least components apart from a DC component (at 0 Hz) by integer multiples of 300 KHz by averaging processing. When the signal shown in FIG. 5D passes through the BBFIL 314, for example, the signal shown in FIG. 5F is left, which has only one fundamental wave component 500 corresponding to a DC component. In the same way, when the signal shown in FIG. 5E passes through the BBFIL 314, the signal shown in FIG. 5G is left, which has only one IM3 component 501 corresponding to a DC component. With this, the BBFIL 314 picks up these signals separately. The electric power measurement section 315 applies averaging processing to the picked up fundamental wave component 500 and IM3 component 501 to detect the individual receiving levels (electric power).

In the above description, the NCO(2) 312 switches the frequency at the predetermined time intervals. The receiving levels of the fundamental wave component 500 and the IM3 component 501 may be detected in parallel. More specifically, for example, in parallel to a block of the mixer 313, the BBFIL 314, and the electric power measurement section 315, described above, a block of a similar mixer, BBFIL, and electric power measurement section may be provided further.

In the digital signal processing section 208, the gain and IIP3 calculator 316 calculates the gain and IIP3 of the radio receiver 207 for the fundamental wave component 500. IIP3 indicates an index for the intermodulation distortion characteristics, as described above, and can be calculated by the following expression.

$$IIP3=(3*(\text{input electric power})+\text{gain}-IM3)/2$$

where, the input electric power indicates the electric power of one fundamental wave at the input end of the radio receiver 207; the gain indicates the gain of the radio receiver 207 for the fundamental wave component 500; and IM3 indicates the electric power of the IM3 component 501 detected by the electric power measurement section 315. In the gain and IIP3 calculator 316, the electric power can be set in advance to the same value as the input electric power specified for the StepATT 306.

Figure 4:
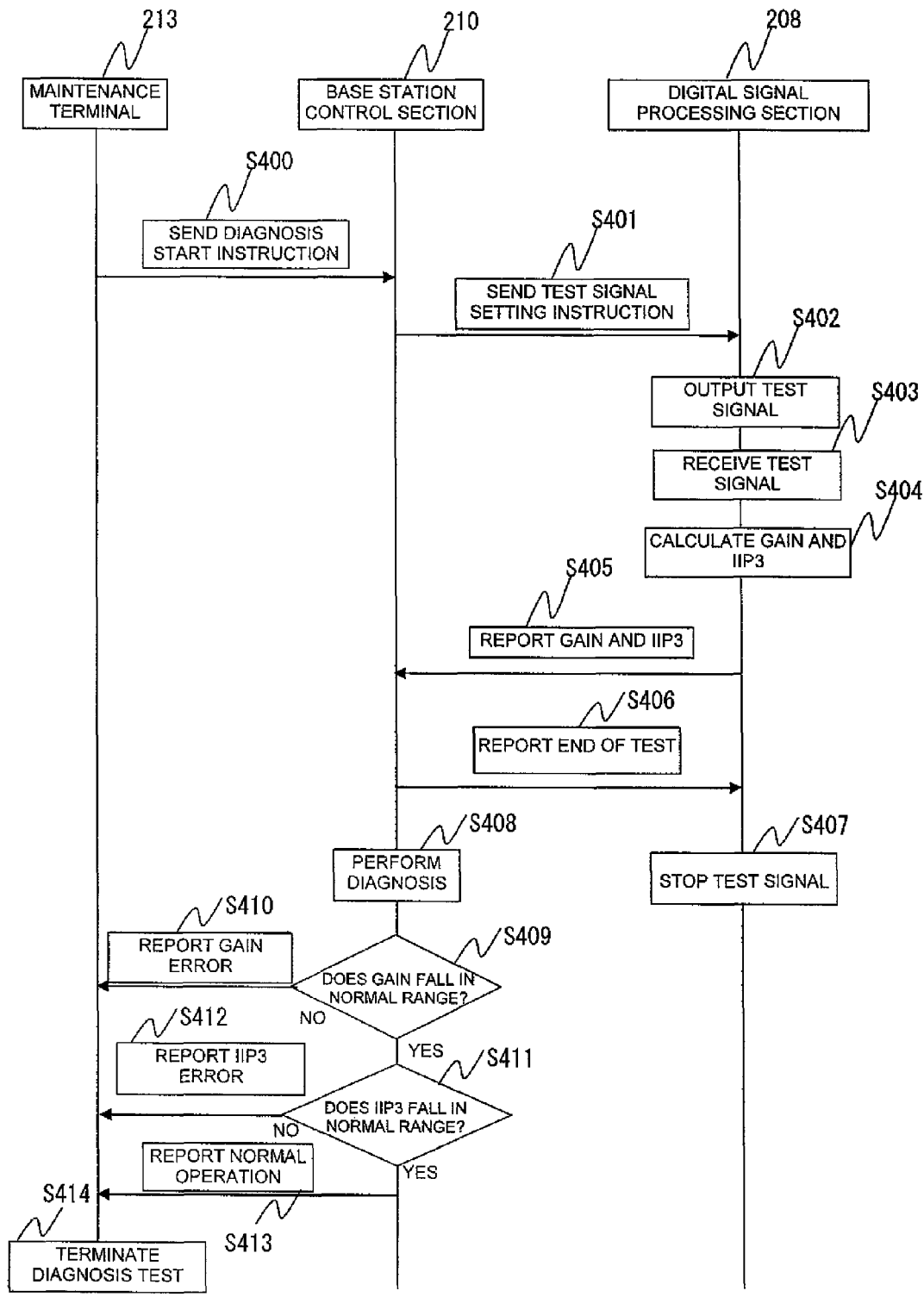
FIG. 4 is a sequence diagram of a fault diagnosis method according to the embodiment.

FIG. 4 is a sequence diagram of a fault diagnosis method of the present embodiment.

Fault detection processing of the present embodiment will be described below for the radio base station 201, which has the structures shown in FIG. 2 and FIG. 3.

Fault diagnosis starts, for example, when a maintenance worker operates the maintenance terminal 213 to input an instruction for executing fault diagnosis. The instruction for executing fault diagnosis includes, for example, identification information of a base station to be tested, identification information (such as a sector identifier or a system identifier) of a receiver to be diagnosed, and information on a channel to be used for fault diagnosis. When a channel not used for operation is selected as a channel to be used for fault diagnosis, for example, a fault diagnosis test can be performed during operation. The timing when the diagnosis starts may be a predetermined time based on a diagnosis schedule specified in advance. A channel having a lower frequency may be automatically selected with priority among channels not used for operation, as a channel to be used for fault diagnosis, for example.

In step S400, the maintenance terminal 213 sends a diagnosis start instruction that includes identification information (such as a sector identifier or a system identifier) of a specified receiver and information on a channel to be tested, to the base station control section 210 of a specified radio base station 201.

In step S401, the base station control section 210 specifies the frequency for the NCO(1) 301 in the digital signal processing section 208, and instructs the digital signal processing section 208 to make the signal oscillation source 300 output a test signal (sends a test signal setting instruction). The frequency of the NCO(1) 301 is set, for example, to a frequency corresponding to the information on the channel specified by the maintenance terminal 213. The base station control section 210 may set the frequency corresponding to the information on the channel by changing the frequency of the synthesizer 304 in the radio analog section 202.

In step S402, the digital signal processing section 208 outputs the test signal from the signal oscillation source 300. Then, as described above with reference to FIG. 3, in the radio analog section 202, the test signal adjusted to have the predetermined electric power in the radio frequency band is generated and sent to the radio receiver 207 through the coupler 203. In step S403, the digital signal processing section 208 receives the test signal. In step S404, the digital signal processing section 208 calculates the gain and IIP3 of the radio receiver 207.

In step S405, the digital signal processing section 208 reports the calculated gain and IIP3 to the base station control section 210. The base station control section 210 records the received gain and IIP3 in the RAM 215. In step S406, the base station control section 210 reports the end of test to the digital signal processing section 208. Upon receiving the end-of-test report, the digital signal processing section 208 stops outputting the test signal and returns to the usual operation state in step S407.

In step S408, the base station control section 210 diagnoses the radio receiver 207 for a fault according to the gain and IIP3 received in step S405. In diagnosis, the base station control section 210 compares the gain and IIP3 recorded in the RAM 215 in step S405 with corresponding normal ranges (allowable ranges) obtained from corresponding normal values and decision values stored in advance in the ROM 216 to determine whether a fault exists or not. Each normal range is, for example, the range defined by the sum of the normal value and a positive decision value and the sum of the normal value and a negative decision value. The normal range can be obtained in advance for each of the gain and IIP3. The normal values and decision values will be described in detail later.

In step S409, the radio base station control section 210 determines whether the gain of the radio receiver 207 falls in the normal range (first normal range). If the gain does not fall in the normal range in step S409 (No in step S409), the radio base station control section 210 reports a gain error to the maintenance terminal 213 in step S410. When the gain falls in the normal range in step S409 (Yes in step S409), the processing proceeds to step S411. Steps S409 and S410 may be omitted.

In step S411, the radio base station control section 210 determines whether IIP3 falls in the normal range (second normal range). If IIP3 does not fall in the normal range in step S411 (No in step S411), the radio base station control section 210 reports an IIP3 error to the maintenance terminal 213 in step S412. When the gain falls in the normal range in step S411 (Yes in step S411), the processing proceeds to step S413. In step S413, the base station control section 210 reports normal operation to the maintenance terminal 213.

In step S414, the maintenance terminal 213 stores the test result; if a gain error or an IIP3 error is reported, displays an alarm on the screen to report a fault to the maintenance worker; or perform other process. Then, the maintenance terminal 213 terminates the diagnosis test.

Figure 6:
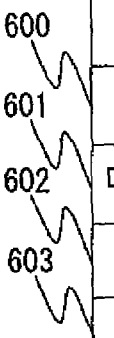
FIG. 6 is a table indicating decision values used for fault diagnosis and fault decision example cases of a receiver in the embodiment.

FIG. 6 shows a table indicating the decision values used for fault diagnosis and fault decision example cases of the receiver in the present embodiment.

In the table, a record of typical (TYP) values 600 indicating the normal receiver performance, a record of decision values 601 used for determining whether the operation is normal or has a fault, a record of values 602 for a fault detection example case (1), and a record of values 603 for a fault detection example case (2) are shown for the input, the output, the gain, the IM3, and the IIP3 of the receiver. As the normal operation values and decision values used in step S408 in FIG. 4, the TYP values 600 and the decision values 601 corresponding to the gain and IIP3 shown in FIG. 6 are, for example, stored in the ROM 216 in advance. The decision values 601 can be set to appropriate values in advance with component variations and other factors taken into account. These values may be set to values other than those shown in FIG. 6.

The example cases of determining whether the receiver has a fault will be described below with reference to FIG. 6.

The example case (1) 602 shows that the radio receiver 207 has a gain error.

In the case (1) 602, the electric power of the fundamental wave 500 of the test signal input to the radio receiver 207 is adjusted to −40 dBm (one wave); and the electric power of the fundamental wave component 500, measured by the electric power measurement section 315 in the digital signal processing section 208 is regarded as an output and it is −10 dBm. The gain is calculated from the input and output. The gain of the radio receiver 207 is 30 dB. In FIG. 6, the normal range of the gain is 40±5 dB from the gain in the TYP values 600 and the decision values 601. Since the gain is 30 dB in the case (1) 602, it is determined that the gain is erroneous. Therefore, in step S410 in FIG. 4, the radio base station control section 210 reports the gain error to the maintenance terminal 213, and the gain error of the radio receiver 207 is detected as a fault.

The example case (2) 603 shows that the gain is normal but the intermodulation distortion characteristics deteriorate.

In the case (2) 603, the gain of the radio receiver 207 is calculated at 40 dB from an input of −40 dBm and an output of 0 dBm. In FIG. 6, the normal range of the gain is 40±5 dB from the gain in the TYP values 600 and the decision values 601. Since the gain is 40 dB in the case (2) 603, it is determined that the gain is normal. The procedure proceeds to the IIP3 diagnosis process in the next step S411 in the base station control section 210. The electric power of the IM3 component 501, measured by the electric power measurement section 315 in the digital signal processing section 208 is −48 dBm; and IIP3 calculated by the gain and IIP3 calculator 316 in the digital signal processing section 208 is −16 dBm. This IIP3 is out of the normal range, −10±5 dBm, calculated from IIP3 values in the TYP values 600 and the decision values 601. Therefore, the base station control section 210 determines that IIP3 is erroneous. In step S412, the radio base station control section 210 reports the IIP3 error to the maintenance terminal 213. With this, the radio receiver 207 having a normal gain and lowered intermodulation distortion characteristics is determined to have a fault.

As described above, in the present embodiment, a receiver having a normal gain and lowered intermodulation distortion characteristics can be determined to have a fault.

The deterioration of the intermodulation distortion characteristics can be determined from the level of a distortion component (IM component). Therefore, the deterioration of the intermodulation distortion characteristics may be determined from the level (electric power) of the IM component or other appropriate index, instead of IIP3. In the present embodiment, the deterioration of the intermodulation distortion characteristics is determined by using IIP3 because it is easy to understand that the distortion characteristics deteriorate when it is found that IIP3 deteriorates since IIP3 (or OIP3: output intercept point) is used as a value indicating the performance of the distortion characteristics of a device, such as an amplifier, or sometimes of a base station. When the input level changes, the level of the IM component also changes. Since the input level is known, the IM component can be measured and used for a fault decision (decision of deterioration in the intermodulation distortion characteristics or fault diagnosis) IM3 (caused by the second harmonics) and IM5 (caused by the third harmonics) have different characteristics. Only IM5 may deteriorate. In the present embodiment, IM3 is measured as an example case. Instead of IM3, an appropriate IM component (distorted component) may be measured and used for a fault decision in the receiver.

The present invention can be used, for example, for a radio base station apparatus in a radio communication system.

What is claimed is:

1. A radio base station comprising:
a receiver for amplifying a signal having a plurality of frequencies and outputting a signal which includes a fundamental wave component of the signal and a intermodulation distortion component caused by intermodulation of the signal;
a signal oscillation source for generating at least two test signals having a predetermined frequency interval;
a test signal transmitter for adjusting the electric power of the test signals generated by the signal oscillation source to a predetermined input electric power to the receiver and outputting the adjusted test signals to the receiver;
a signal processing section for receiving the test signals generated by the signal oscillation source and amplified by the receiver and obtaining electric power of a fundamental wave component and electric power of an intermodulation distortion component of received test signals; and
a control section for determining whether the receiver works normally or an intermodulation error occurs,
wherein
the signal processing section calculates a gain of the receiver from obtained electric power of the fundamental wave component and the predetermined input electric power and,
the control section determines whether the calculated gain falls within a first predetermined allowable range to determine whether the receiver works normally or a gain error occurs,
further wherein
the signal processing section calculates an index for the intermodulation distortion characteristics of the receiver by the following expression from the electric power of the obtained intermodulation distortion component, the calculated gain, and the predetermined input electric power
the index=3×(input electric power)+gain−(electric power of intermodulation distortion component); and
the control section determines whether the index for the intermodulation distortion characteristics falls within a second predetermined allowable range to determine whether the receiver works normally or an intermodulation error occurs.

2. The radio base station according to claim 1, further comprising
a first converter for converting the frequencies of the test signals generated by the signal oscillation source to frequencies corresponding to a specified channel.

3. The radio base station according to claim 1,
wherein the signal processing section comprises:
a filter for passing a predetermined frequency component;
a second converter for converting the frequencies of the fundamental wave components and the intermodulation distortion component of the test signals amplified by the receiver to a pass frequency of the filter; and
an electric power measurement section for measuring the electric power of the fundamental wave components and the intermodulation distortion component of the test signals which have passed the filter.

4. The radio base station according to claim 3,
wherein the second converter converts the frequency of the fundamental wave components to the pass frequency of the filter and converts the frequency of the intermodulation distortion component to the pass frequency of the filter, in a time division manner; and
the electric power measurement section measures the electric power of the fundamental wave components and the intermodulation distortion component of the test signals which have passed the filter, in a time division manner.

5. The radio base station according to claim 1, wherein the control section sends a determination result to a maintenance terminal.

6. A receiver fault diagnosis method for diagnosing a fault of a receiver for amplifying a signal having a plurality of frequencies and outputting a signal which includes a fundamental wave component of the signal and an intermodulation distortion component caused by intermodulation of the signal, the method comprising:

generating at least two test signals having a predetermined frequency interval;

adjusting the electric power of the test signals to a predetermined input electric power to the receiver and outputting adjusted test signals to the receiver;

obtaining electric power of a fundamental wave component and electric power of an intermodulation distortion component of the test signals amplified by the receiver;

calculating a gain of the receiver from obtained electric power of the fundamental wave components and the predetermined input electric power;

determining whether the calculated gain falls within a first predetermined allowable range to determine whether the receiver works normally or a gain error occurs;

calculating an index for the intermodulation distortion characteristics of the receiver by the following expression from the electric power of the obtained intermodulation distortion component, the calculated gain, and the predetermined input electric power where the index=3×(input electric power)+gain−(electric power of intermodulation distortion component); and determining whether the receiver works normally or an intermodulation error occurs according to whether the index for the intermodulation distortion characteristics falls within a second predetermined allowable range.

7. The receiver fault diagnosis method according to claim 6, further comprising:

converting the frequencies of the test signals to frequencies corresponding to a specified channel.

8. The receiver fault diagnosis method according to claim 6, wherein the obtaining the intermodulation distortion component includes:

converting the frequencies of the fundamental wave components and the intermodulation distortion component of the test signals amplified by the receiver to a pass frequency of a filter which passes a predetermined frequency component; and measuring the electric power of the fundamental wave components and the intermodulation distortion component of the test signals which have passed the filter.

9. The receiver fault diagnosis method according to claim 8, wherein the converting the frequencies includes converting the frequency of the fundamental wave components to the pass frequency of the filter and converting the frequency of the intermodulation distortion component to the pass frequency of the filter, in a time division manner; and the electric power of the fundamental wave components and the intermodulation distortion component of the test signals, which have passed the filter, are measured in a time division manner.

10. The receiver fault diagnosis method according to claim 6, further comprising sending a determination result to a maintenance terminal.

\* \* \* \* \*